(12) United States Patent
Frank (10) Patent No.: US 11,821,474 B2
(45) Date of Patent: Nov. 21, 2023

(54) BRAKING SYSTEM FOR A VEHICLE

(71) Applicant: Bayerische Motoren Werke Aktiengesellschaft, Munich (DE)

(72) Inventor: Oliver Frank, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 172 days.

(21) Appl. No.: 17/594,116

(22) PCT Filed: Apr. 3, 2020

(86) PCT No.: PCT/EP2020/059596
§ 371 (c)(1),
(2) Date: Oct. 4, 2021

(87) PCT Pub. No.: WO2020/207925
PCT Pub. Date: Oct. 15, 2020

(65) Prior Publication Data
US 2022/0154787 A1  May 19, 2022

(30) Foreign Application Priority Data
Apr. 10, 2019 (DE) .................. 10 2019 109 465.8

(51) Int. Cl.
*F16D 49/00* (2006.01)

(52) U.S. Cl.
CPC .................. *F16D 49/00* (2013.01)

(58) Field of Classification Search
CPC .................. F16D 49/00; F16D 63/006
See application file for complete search history.

(56) References Cited

U.S. PATENT DOCUMENTS

| | | | |
|---|---|---|---|
| 4,934,490 A | 6/1990 | Chang | |
| 5,065,848 A * | 11/1991 | Barrett | B60R 25/08 188/31 |
| 5,133,201 A | 7/1992 | LaMott et al. | |
| 6,164,420 A | 12/2000 | Fleischer | |
| 6,250,433 B1 * | 6/2001 | Sealine | B60T 1/005 188/69 |

(Continued)

FOREIGN PATENT DOCUMENTS

| | | | | |
|---|---|---|---|---|
| CN | 1616281 A | | 5/2005 | |
| CN | 105980223 A | * | 9/2016 | B60T 1/005 |

(Continued)

OTHER PUBLICATIONS

Chinese-language Office Action issued in Chinese Application No. 202080024795.3 dated Oct. 26, 2022 with English translation (15 pages).

(Continued)

*Primary Examiner* — Melanie Torres Williams
(74) *Attorney, Agent, or Firm* — Crowell & Moring LLP (57) ABSTRACT

A braking system for a vehicle that includes at least one vehicle wheel and a friction brake associated with the vehicle wheel. The friction brake acts during an operation state of the vehicle and/or while the vehicle is in a parked state. The braking system includes an additional mechanical locking device for the vehicle wheel. The mechanical locking device secures the vehicle wheel in a form-fitting manner when the vehicle is in the parked state to prevent the vehicle wheel from rolling.

18 Claims, 6 Drawing Sheets

(56) References Cited

U.S. PATENT DOCUMENTS

| | | | |
|---|---|---|---|
| 7,707,861 B2 * | 5/2010 | Xavier | ................. E05C 19/184 70/56 |
| 9,644,694 B2 | 5/2017 | Smeeton | |
| 2002/0020587 A1 | 2/2002 | Song | |
| 2012/0248849 A1 | 10/2012 | Fischer et al. | |
| 2017/0234380 A1 * | 8/2017 | Yasui | ................... F16D 63/006 188/72.1 |

FOREIGN PATENT DOCUMENTS

| | | | | |
|---|---|---|---|---|
| DE | 197 50 420 | A1 | | 5/1999 |
| DE | 198 16 801 | A1 | | 11/1999 |
| DE | 19901688 | A1 * | 7/2000 | .............. B60T 1/005 |
| DE | 101 38 969 | A1 | | 4/2002 |
| DE | 10 2010 049 601 | A1 | | 6/2011 |
| DE | 10 2015 200 737 | A1 | | 7/2016 |
| JP | 2006-151210 | A | | 6/2006 |
| WO | WO 92/14635 | A1 | | 9/1992 |
| WO | WO 93/09981 | A1 | | 5/1993 |
| WO | WO 00/42333 | A1 | | 7/2000 |

OTHER PUBLICATIONS

International Search Report (PCT/ISA/210) issued in PCT Application No. PCT/EP2020/059596 dated Jun. 29, 2020 with English translation (seven (7) pages).

German-language Written Opinion (PCT/ISA/237) issued in PCT Application No. PCT/EP2020/059596 dated Jun. 29, 2020 (five (5) pages).

German-language Search Report issued in German Application No. 10 2019 109 465 .8 dated Apr. 21, 2020 with partial English translation (10 pages).

* cited by examiner

BRAKING SYSTEM FOR A VEHICLE

BACKGROUND AND SUMMARY OF THE INVENTION

The present subject matter relates to braking system for a vehicle.

In order to avoid that a vehicle, in particular a passenger motor vehicle in the parked state, unintentionally rolls away, two systems which are typically used alongside one another are in particular known in the prior art. In order to prevent a parked vehicle from unintentionally rolling away and to guarantee an anti-theft safeguard, there is a so-called transmission parking lock for automatic transmissions. When the position P is selected by the transmission shift lever, the transmission output is locked in relation to the housing by a toothed wheel and a catch. Such a transmission parking lock is automatically activated when a parked position of the vehicle is detected, for example, when the motor is switched off.

Anti-theft safeguards of this type, such as the transmission parking lock and the steering wheel lock, require a significant technical input, and by virtue of the different embodiments of transmissions (e.g., manual shift and automatic transmissions) and different steering column embodiments (e.g., left-hand drive and right-hand drive) require a plurality of variants and thus, additional costs. Furthermore, it is even more complex for such a transmission parking lock to be configured in vehicles that do not comprise a transmission such as is known in the case of an internal combustion engine. For example, no automatic transmission is provided in an electric vehicle, so that a known transmission parking lock can only be implemented by way of high complexity, additional costs and additional parts.

Apart from the transmission parking lock mentioned, vehicles in the prior art moreover (thus additionally to the transmission parking lock) usually comprise a second (redundant) system for preventing the parked vehicle from unintentionally rolling away. This second system is embodied by a parking brake known from the prior art. A parking brake is a brake which permanently blocks the wheels of a vehicle or an aircraft. Using the parking brake, the vehicle or aircraft, respectively, can be parked without the latter unintentionally rolling away. The parking brake of passenger motor vehicles is operated, for example, as a cable brake using a hand lever or a foot lever (foot parking brake). A configuration as an electrically acting parking brake is likewise known from the present prior art. This electrically acting parking brake usually comprises an electric motor which initiates a clamping element (for example a brake piston and a brake pad of a disc brake) on a brake (for example a disc brake) to clamp. The electric motor here moves a spindle which in turn pushes a brake piston against brake pads, the brake pads then in turn being pushed against a brake disc of a wheel of the vehicle. The parking brake in the compressed position is permanently activated by a suitable locking mechanism, or a self-locking mechanism, respectively, of the spindle. Any rotation of the wheels is prevented, and the vehicle is secured against rolling away. In the parking brakes known from the prior art, the transmission of force here takes place by the friction-fit of the brake pads on a brake disc (or on a brake drum in the case of the drum brake). Such a parking brake can reliably guarantee that a parked vehicle is prevented from rolling away on a gradient of typically 20% under all conditions. In the case of a steep gradient of the road surface on which the parked vehicle is parked, and in particular under unfavorable parameters (load, battery voltage, temperature, moisture, corrosion, battery voltage, etc.), such a parking brake can no longer prevent the vehicle from unintentionally rolling away.

As already mentioned, the parking brake and a transmission parking lock mentioned are often configured so as to be redundant, wherein the transmission parking lock can assume the function of the parking brake in the event of the electromechanical parking brake failing or malfunctioning, respectively. Conversely, the parking brake can assume the function of the transmission parking lock in the event of a failure of the latter.

DE 19750420A1 describes an electrically activatable parking brake for a vehicle, wherein a ratchet wheel, which is connected in a rotationally fixed manner to the drive shaft of the electric motor of the brake, is provided. The ratchet wheel, and thus, the brake can be mechanically established by way of two blocking catches, which are disposed so as to be symmetrical to the ratchet wheel and are pivotable by means of a solenoid. Upon having previously tensioned the service brake by way of a disc brake known from the prior art, the electrical drive of this service brake is locked so that the braking effect in the sense of a parking brake is maintained for the stationary vehicle. The transmission of force here is largely the friction fit of the disc brake, wherein preventing the rolling away of the vehicle in the parked state can likewise be guaranteed only up to a limited gradient.

It is an object of the invention to provide a braking system for a vehicle that guarantees that the parked vehicle is secured to the maximum possible extent in each situation and is nevertheless optimized with a view to the complexity in terms of production and implementation.

Proposed is a braking system for a motor vehicle, which comprises at least one (preferably four) vehicle wheel(s), the vehicle wheel in turn being assigned a friction brake.

Such a friction brake here preferably represents a disc brake or a drum brake known from the prior art.

In such a friction brake, it is preferably provided that an electromechanical force-generating installation (for example, an electric motor) initiates a clamping element (for example, a brake piston and a brake pad) on the friction brake (in particular, the disc brake or the drum brake) to clamp. The mechanical force-generating installation here preferably moves a spindle which in turn pushes a brake piston, known from the prior art, against brake pads (clamping element), likewise known from the prior art, which brake pads then in turn are pressed against a brake disc or a brake drum of a wheel of the vehicle. Any rotation of the wheels is prevented, and the vehicle is secured against rolling away.

It is furthermore possible for this friction brake, the latter representing the service brake of the vehicle wheel for example, to also assume the function of a parking brake in that the clamped state of the clamping element is locked. In such a preferred embodiment, it is furthermore preferably provided that the braking system, or the vehicle, respectively, does not comprise any transmission parking lock known from the prior art.

It is furthermore provided that the braking system, apart from the friction brake mentioned on the vehicle wheel, comprises an additional mechanical locking device of the vehicle wheel. This additional mechanical locking device here is configured in such a manner that the latter fixes in a form-fitting manner the vehicle wheel in the parked state of the vehicle, or secures the vehicle wheel from rolling away, respectively.

This fixing of the vehicle wheel here does not take place by way of a friction-fit, as is known in a parking brake known from the prior art, but by way of a form-fit. The transmission of force when fixing the vehicle wheel by the mechanical locking device thus takes place by way of the form-fit mentioned. Furthermore, the vehicle wheel by way of this form-fit is fixed directly (as opposed to the brake blocks of the friction brake in a parking brake known from the prior art).

This form-fit and the fixing of the vehicle wheel by means of the additional locking device mentioned have the advantage that it can be guaranteed that the vehicle wheel in the parked state under all conditions is prevented from rolling away at gradients of significantly more than 20%. Moreover, a friction-fitting parking brake could be entirely dispensed with as a result of the use of the locking device, and the basic design of the service brake could be simplified.

It is furthermore preferably provided that the additional mechanical locking device mentioned is disposed in the vehicle in place of a transmission parking lock known from the prior art. The vehicle in this instance thus preferably does not comprise any transmission parking lock, wherein the function of preventing the unintentional rolling away of the vehicle in the parked state is then assumed by the additional locking device. A sufficient safeguard for preventing the vehicle from rolling away in the parked state can thus also be guaranteed with little complexity in a vehicle which does not comprise any transmission (for example an automatic transmission).

A parked state of the vehicle in the context of this invention is in particular to be understood as that state of the vehicle in which the motor of the vehicle is switched off over a specific period of time and the vehicle is parked, for example.

In a preferred embodiment of the invention it is provided that the mechanical locking device is formed by an engagement of a blocking element, fixed to the vehicle, in a receptacle element, (preferably disposed so as to be coaxial with the wheel rotation axis and) connected in a rotationally fixed manner to the vehicle wheel, during a parked state of the vehicle.

The blocking element here is preferably disposed so as to be fixed to the vehicle, that is to say that the blocking element does not rotate conjointly with the vehicle wheel and is fixedly connected to a vehicle superstructure, or to a vehicle body, respectively. In contrast, the receptacle element is preferably connected in a rotationally fixed manner to the vehicle wheel, that is to say that the receptacle element rotates conjointly with the vehicle wheel and is connected to the vehicle wheel either directly or indirectly (for example by way of one or a plurality of intermediate elements).

In the parked state of the vehicle, the blocking element in this instance preferably engages in the receptacle element as a result of which it is prevented that the vehicle wheel rolls or rotates, respectively.

In a further preferred embodiment of the invention the blocking element is configured as a blocking catch. The receptacle element in this instance is preferably configured as a ratchet wheel which is connected in a rotationally fixed manner to the vehicle wheel (and preferably disposed so as to be coaxial with the wheel rotation axis). For example, the ratchet wheel can thus be configured as a type of gear wheel which comprises a plurality of teeth. During a parked state of the vehicle, the catch can in this instance engage in the ratchet wheel such that a rotating movement of the vehicle wheel, and thus rolling away of the vehicle wheel, is prevented.

Alternatively thereto, it is possible for the blocking element to be configured as a pin, and for the receptacle element to be configured as a bore on a perforated element which comprises a plurality of bores and is connected in a rotationally fixed manner to the vehicle wheel (and preferably disposed so as to be coaxial with the rotation axis of the vehicle wheel). In the parked state of the vehicle, the pin, fixed to the vehicle, can in this instance engage in the bore of the rotationally fixed perforated element such that rotating of the vehicle wheel and thus rolling away of the vehicle wheel are prevented. The perforated element can be configured as a type of perforated disc, for example, which is disposed so as to be coaxial to the vehicle wheel and comprises a plurality of bores which are distributed across the circumference, or on the disc face, respectively, of the perforated disc.

For example, it is possible for a brake disc of a disc brake to represent the perforated element mentioned, wherein the brake disc has a plurality of bores which are disposed or run, respectively, parallel to the rotation axis or the central axis, respectively, of the brake disc.

In a preferred embodiment of the invention it is provided that the mechanical locking device is disposed in the wheel region or in the axle region of the vehicle.

For example, the receptacle element can be disposed in a wheel region of the vehicle. The receptacle element here is particularly preferably disposed on a brake disc of a vehicle. As already mentioned, the brake disc per se here can represent the receptacle element (in particular the perforated disc mentioned), for example. Alternatively, the receptacle element (in particular the ratchet wheel) can be connected in a rotationally fixed manner to the brake disc or the wheel chamber, for example.

Alternatively, it is also possible for the receptacle element to be disposed in an axle region of the vehicle. If the vehicle wheel (or even a plurality of vehicle wheels) is/are driven by a drive shaft in the axle region, for example, it is thus possible for the receptacle element to be connected in a rotationally fixed manner to the driveshaft.

In a further preferred embodiment of the invention it is possible for the receptacle element to be produced during the production process of a friction element of the friction brake, in particular a brake disc of a disc brake or a brake drum of a drum brake. It is preferable here that the receptacle element and the friction element after the production process of the vehicle brake are integrally configured. As has already been mentioned above, it is thus possible, for example, that a brake disc of a disc brake, or a brake drum of a drum brake, already represent a preferred perforated disc mentioned, or a ratchet wheel. For example, such a ratchet wheel, or such a perforated element, respectively, can be integrated in the brake disc directly in a casting method of a brake disc. Such a preferred embodiment has the advantage that separate manufacturing of the receptacle element and thus complexity and costs can be dispensed with.

It is moreover also possible for the blocking element to be produced during the production of a component fixed to the vehicle, and for the blocking element conjointly with this component fixed to the vehicle, after the production process thereof (for example by a forming method) to represent an integral component.

Alternatively to the embodiment last mentioned, it is also possible for the receptacle element, or the blocking element, respectively, to be configured as separate components and for the receptacle element to be connected to the component that is rotationally fixed to the wheel (in particular to the vehicle axle) only after the production process of the latter, or for the blocking element to be connected to the component fixed to the vehicle only after the production process of the latter.

It is furthermore preferably provided here that the blocking element is disposed on a brake caliper of a friction brake (in particular in the case of a disc brake or a drum brake), or on a component fixed to the vehicle (thus a non-rotating component), respectively. The blocking element here can be integrated in a brake caliper (or at least partially in a brake caliper) as well as be disposed in such a brake caliper. The advantage of the integrated embodiment is that any external manipulation is impeded as a result of the impeded accessibility within the brake caliper.

It is particularly preferable here for the blocking element to be able to be (particularly mechanically) coupled to a parking brake such that the blocking element when activating a parking brake is moved in such a manner that the blocking element engages in the receptacle element. For example, the blocking element here can be disposed on a brake caliper of a disc brake in such a manner that the blocking element is coupled to a spindle of the parking brake of the braking system such that the blocking element in a movement of the spindle (to a clamped position of the clamping element of the parking brake) is likewise moved and engages in the receptacle element.

It is furthermore preferably provided that the braking system comprises an installation for fixing the position of the blocking element. This installation for fixing the position guides, or moves, or holds, respectively, the blocking element in the two positions "blocking element engaging in receptacle element" and "blocking elements not engaging in receptacle element". For example, the installation for fixing the position can comprise a pre-loaded spring element which holds, or guides, or moves, respectively, the blocking element in the respective position. The preferred spring element here is furthermore preferably pre-loaded in the position "blocking element not engaging in receptacle element" (=initial situation), while the spring element is not pre-loaded in the position "blocking element engaging in receptacle element".

It is thus preferably provided that the position "blocking element engaging in receptacle element" thus represents the locked position of the locking device, thus a safe state in which no pre-load or external force is required in order for the position to be maintained. In contrast, in the position "blocking element not engaging in receptacle element", thus in particular during the operation of the vehicle, it is preferably provided that the locking device by way of the pre-load, or by way of an external force, respectively, has to be kept open.

Alternatively thereto, the converse case is likewise possible, in which the position "blocking element not engaging in the receptacle element" represents the state in the absence of a force, or the safe state, respectively, of the locking device, and during the position "blocking element engaging in receptacle element" an external force, or a pre-load mentioned, respectively, has to be applied in order to remain in this position.

This installation for fixing the position is preferably connected directly to the blocking element. Moreover, the installation for fixing the position here is particularly preferably disposed on a brake caliper of a disc brake, or on a wheel cylinder of a drum brake, respectively.

Alternatively to the spring element mentioned, the installation for fixing the position can comprise a magnet or a cable pull, respectively, for example.

It is furthermore preferably provided that the installation for fixing the position of the blocking element is electrically or electro-hydraulically or hydraulically or magnetically or mechanically activatable, respectively. The blocking element can be moved to the respective position by such an activation of the installation for fixing the position.

It is particularly preferably provided here that the installation for fixing the position of the blocking element can be activated by an already existing actuating installation of the vehicle, in particular by an actuating installation for activating the friction brake or of the parking brake, respectively, of the vehicle wheel. To this end, the installation for fixing the position of the blocking element can be coupled to a motor-transmission unit of the friction brake, or of the parking brake, respectively, for example. It is furthermore possible here for the installation for fixing the position of the blocking element to be coupled to the actuating installation of the parking brake in such a manner that the installation for fixing the position of the blocking element is likewise activated when the parking brake is activated.

Apart from the braking system mentioned, a method for operating a braking system which is configured according to one of claims 1 to 11 is furthermore proposed.

The position in which the blocking element does not engage in the receptacle element here describes the initial position. The braking system in this initial position is thus situated in the position "blocking element not engaging in receptacle element". In this initial position it is provided that the blocking element is situated in a pre-loaded position. For example, this pre-loaded position can be implemented by pre-loading the installation for fixing the position, in particular by a suitable spring element.

When it is detected in a next step that the vehicle assumes a parked state, it is thus provided that the blocking element moves in the direction of the receptacle element.

The detection of the parked state of the vehicle preferably takes place by a suitable detection installation. For example, it can be detected here that the drive unit of the vehicle (thus the motor, for example) is switched off over a specific period of time and/or a parking switch for adjusting a parked state of the vehicle is activated. It is furthermore possible that the detection installation identifies that the vehicle is situated in the parked state and on a gradient, whereby an activation of the mechanical locking device could be required in order to avoid that the vehicle rolls away.

When detecting a parked state of the vehicle, the blocking element is thus moved in the direction of the receptacle element. This movement here preferably takes place by an installation for fixing the position mentioned, in particular by an electrical or mechanical or hydraulic or electro-hydraulic or manual or magnetic activation, respectively, of the blocking element or of the installation for fixing the position, which is connected to the blocking element, respectively.

It is furthermore provided that the blocking element at the end of the movement in the direction of the receptacle element engages in the latter. The braking system, or the blocking element, respectively, in this instance assumes the position "blocking element engaging in receptacle element".

As has been described further above, it is particularly preferably provided here that the blocking element represents a blocking catch or a pin which engages in a ratchet wheel or a bore of a perforated element (as a receptacle element).

It is preferably provided here that the receptacle element (thus in particular the ratchet wheel or the bore of the perforated element, respectively) is positioned in such a manner, and the mass of the blocking element (thus in particular of the blocking catch or of the pin) is configured in such a manner, and the pre-load of a compensation spring is adjusted in such a manner that the pre-load of the blocking element is completely released only upon reaching a critical rotating speed of the vehicle wheel, such that the blocking element engages in the receptacle element and assumes the position "blocking element engaging in receptacle element" only upon reaching this critical rotating speed.

Such a critical rotating speed here is preferably a speed which is almost zero (for example between 5 and 0 km/h), thus almost representing the parked state of the vehicle (without the vehicle wheels rotating).

A preferred configuration of this type prevents that the blocking element engages in the receptacle element in a moving state of the vehicle (faster than the preferred maximum of 3 miles per hour). Any potential damage to the braking system or similar can thus be advantageously avoided.

This state in which the blocking element is indeed already moved in the direction of the receptacle element, but engages in the receptacle element only beyond a critical rotating speed of the vehicle wheel, represents a preferred transition state.

It is furthermore preferably provided that when detecting a change from the parked state to the moving state, or to an operation of the vehicle, respectively (for example by a suitable detection device), the blocking element is removed from the receptacle element again and moved back to the initial position. The moving state of the vehicle, or the operation of the vehicle, respectively, can be detected, for example, by way of an activated drive unit, or by a selection of a gear, respectively, or by way of a speed of the vehicle, respectively, or by way of suitable sensor assemblies, or further parameters, respectively.

The movement of the blocking element back to the initial position here preferably takes place by the installation mentioned for fixing the position of the blocking element. For example, the blocking element can be moved back to the initial position by way of an electrical or mechanical or hydraulic or electro-hydraulic or magnetic or manual activation, respectively.

It is particularly preferably provided here that the blocking element is mechanically coupled to a parking brake of the vehicle. Such a mechanical coupling here has the effect that the blocking element is moved conjointly with a parking brake (for example an electric or electro-hydraulic parking brake known from the prior art) to a "blocking" position. When the parking brake of a vehicle, the former being in particular likewise disposed on the vehicle wheel, is thus activated, it is thus preferably provided that the blocking element is also simultaneously moved from the initial position in the direction of the receptacle element. The blocking element here can likewise be moved by the actuator, or that enabling member of the parking brake, respectively, for example. Such an enabling member or actuator, respectively, can represent an electric motor, for example. It is furthermore preferable for the blocking element to be moved back to the initial position when the parking brake is deactivated.

Alternatively to the embodiment last mentioned, it is however also possible for the mechanical locking device not to be coupled to a parking brake but to be disposed so as to be redundant in relation to the latter. This has the advantage the mechanical locking device can be effective when a parking brake of the vehicle fails or malfunctions. If there is no requirement in terms of redundancy, the mechanical locking device can alternatively replace the parking brake.

The invention mentioned advantageously demonstrates a braking system of a vehicle which advantageously avoids that the parked vehicle rolls away. The rolling away of the vehicle under unfavorable parameters on a steep gradient can be avoided without a complex and costly transmission parking lock having to be used here, or without the customer having to take special precautionary measures, such as placing wheel chocks.

These and further features emerge not only from the claims and from the description but also from the drawings, wherein the individual features may be realized in each case individually or severally in the form of sub-combinations in an embodiment of the invention and constitute advantageous and independently protectable designs, for which protection is claimed here.

DETAILED DESCRIPTION OF THE DRAWINGS

Figure 1:
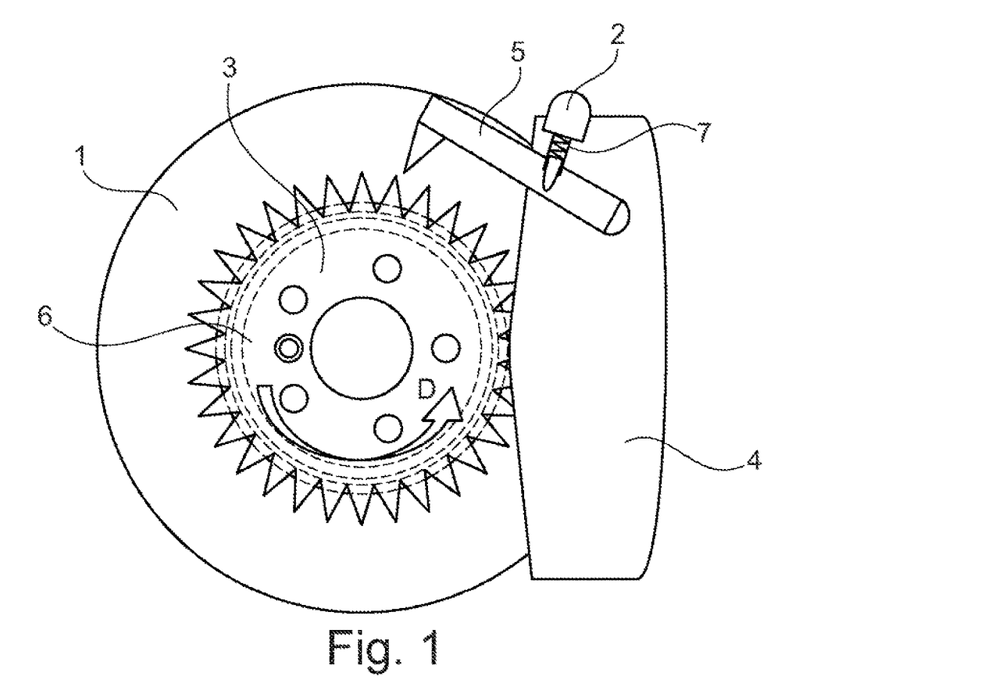
FIG. 1 shows a schematic front view of a disc brake of a braking system in an open, non-braked position according to the present subject matter.

FIG. 1 is a wheel brake of a vehicle, in particular a disc brake of a vehicle. The disc brake comprises a brake disc 1 and a disc chamber 3, the brake disc 1 and the disc chamber 3 during travel conjointly rotating with the vehicle wheel. This disc brake furthermore comprises a brake caliper 4 having brake pads which are not plotted and during an activation of the brake are pressed onto the brake disc 1, and braking by friction thus taking place. The braking system shown moreover comprises an additional mechanical locking device. This additional locking device fixes in a form-fitting manner the vehicle, or the wheel, respectively, in the parked state, wherein rolling away of the vehicle or of the wheel, respectively, is prevented. The locking of the vehicle wheel here is not caused by friction braking, as in the case of the disc brake, but by a form-fit.

Figure 2:
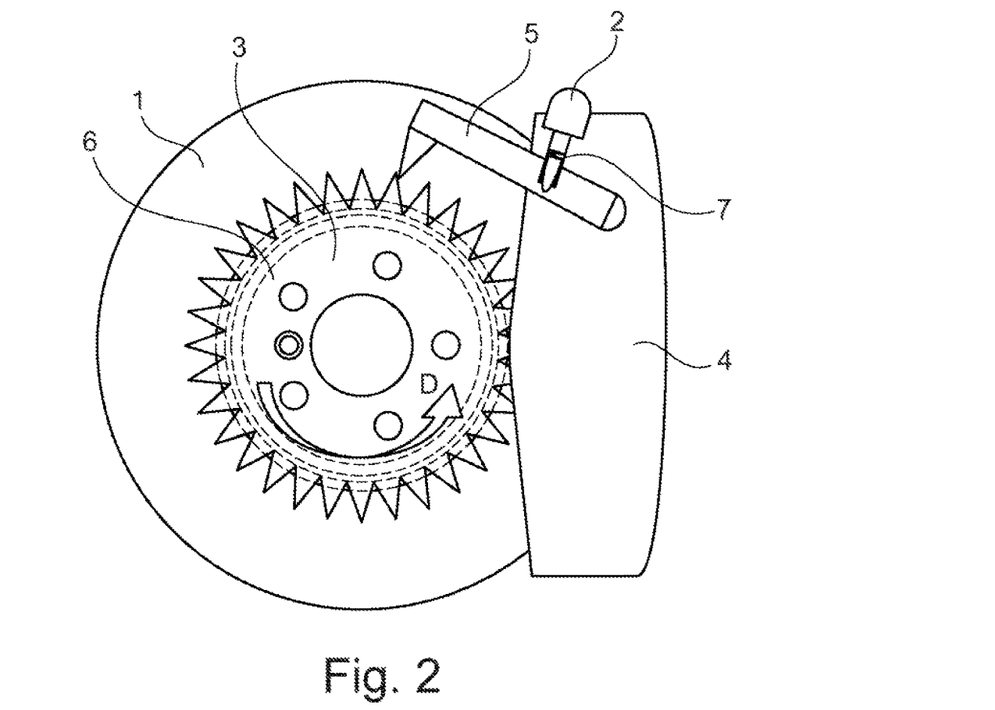
FIG. 2 shows a schematic front view of a disc brake of a braking system in an intermediate state between a braked and a non-braked situation according to the present subject matter.
Figure 3:
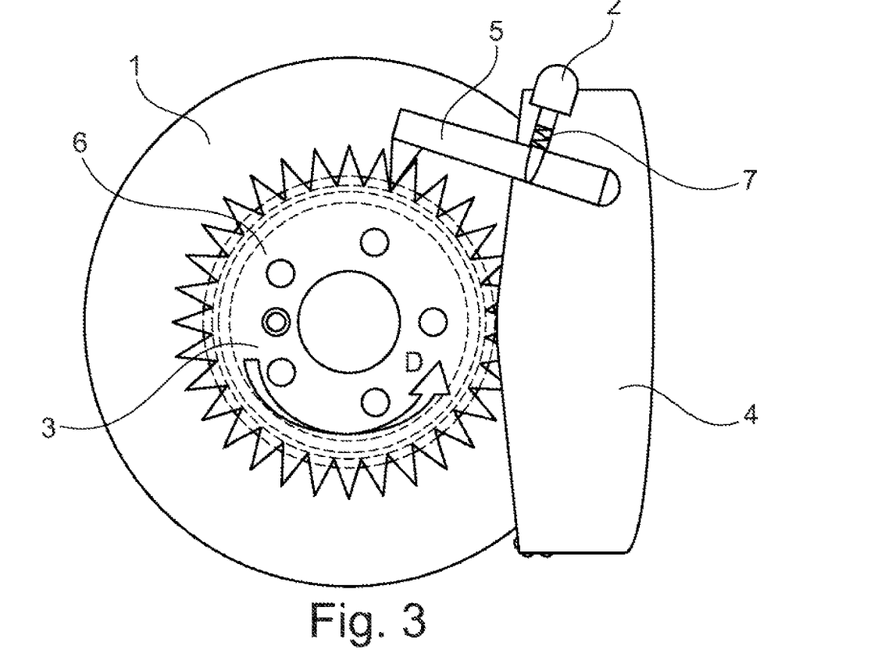
FIG. 3 shows a schematic front view of a disc brake of a braking system in a braked position according to the present subject matter.

The locking device here comprises a blocking element fixed to the vehicle, which in this specific example from FIGS. 1-3, is configured as a blocking catch 5. In order to produce the form-fit mentioned of the locking device, the blocking element engages in a receptacle element which is disposed so as to be coaxial with the wheel rotation axis A and is connected in a rotationally fixed manner to the vehicle wheel (for example so as to rotate in the direction of the arrow D). The receptacle element in the example from FIG. 1, FIG. 2 and FIG. 3 represents a ratchet wheel 6. The form-fit is thus produced by the blocking catch 5 engaging in the ratchet wheel 6, wherein the wheel is locked, or a rotating movement (cf. arrow D) of the wheel is prevented.

The mechanical locking device in FIG. 1 is shown in a non-active, or opened, respectively position, thus in such a manner that the blocking catch 5 does not engage in the ratchet wheel 6 and no form-fit is established. In order for this non-engaging setting, or position, respectively, (also referred to as the opened position) is maintained in particular during travel of the vehicle, it is furthermore provided that the mechanical locking device has a pre-load spring which is not plotted and is preferably disposed so as to be integrated in the actuator 2. The pre-load spring can alternatively also be configured as a magnet. In the initial situation, thus in the opened position (during the travel of the vehicle) it is preferably provided that the pre-load spring is pre-loaded in such a manner that the opened setting, or the opened position, respectively, of the locking device is actively retained. Force thus has to be actively applied in order for the blocking catch to be held in the opened position. The pre-load spring here is part of the above-mentioned installation for fixing the position, for example.

When a change of the vehicle to a parked state is detected, it is provided that the pre-load of the pre-load spring is released and the blocking catch 5 is moved in the direction of the ratchet wheel 6. This movement here takes place by releasing the pre-load of the pre-load spring. The detection of the parked state of the vehicle here can take place by suitable parameters or sensor assemblies, respectively.

It is furthermore preferably provided that the blocking catch 5 engages in the ratchet wheel 6 only upon reaching a maximum critical speed of the vehicle. For example, if the vehicle reaches a speed of below 3 miles per hour, the blocking catch 5 only then engages in the ratchet wheel 6. As a result, it can advantageously be avoided that the braking system is damaged by virtue of an excessive speed of the vehicle while the blocking catch 5 engages in the ratchet wheel 6. The delayed engagement of the blocking catch 5 in the ratchet wheel 6 only upon reaching the maximum critical speed of the vehicle can be adjusted by the pre-load of a compensation spring 7, or by the mass of the blocking catch 5, or by the design of the ratchet wheel 6 and the blocking catch 5, respectively. Until this maximum critical rotating speed is reached, it is provided that the blocking catch 5 is situated in an intermediate state. This intermediate state can be seen in FIG. 2. The blocking catch 5 herein remains in this intermediate position pre-loaded by the compensation spring 7 mentioned until the mentioned critical rotating speed of the wheel, or the critical speed of the vehicle, respectively, is reached. Upon reaching the critical rotating speed or the critical speed, respectively, the pre-load of the compensation spring 7 is released and the blocking catch 5 drops into the toothing of the ratchet wheel 6, as a result of which the form-fit mentioned is created.

The braking system from FIG. 1 is shown in FIG. 3, wherein the blocking catch 5 engages in the ratchet wheel 6 and the vehicle wheel is locked.

The activation for releasing the pre-load of the pre-load spring can take place by the installation for fixing the position mentioned, for example hydraulically or electrically or manually or electro-hydraulically or magnetically, respectively. A suitable hydraulically or electrically or electro-hydraulically or manually or magnetically activatable device 2, or actuator assembly 2, respectively, can likewise be used for releasing the locked position of the blocking catch 5 for the latter to return to the initial position in which the blocking catch 5 does not engage in the ratchet wheel 6 and the pre-load of the pre-load spring is re-established.

Figure 4:
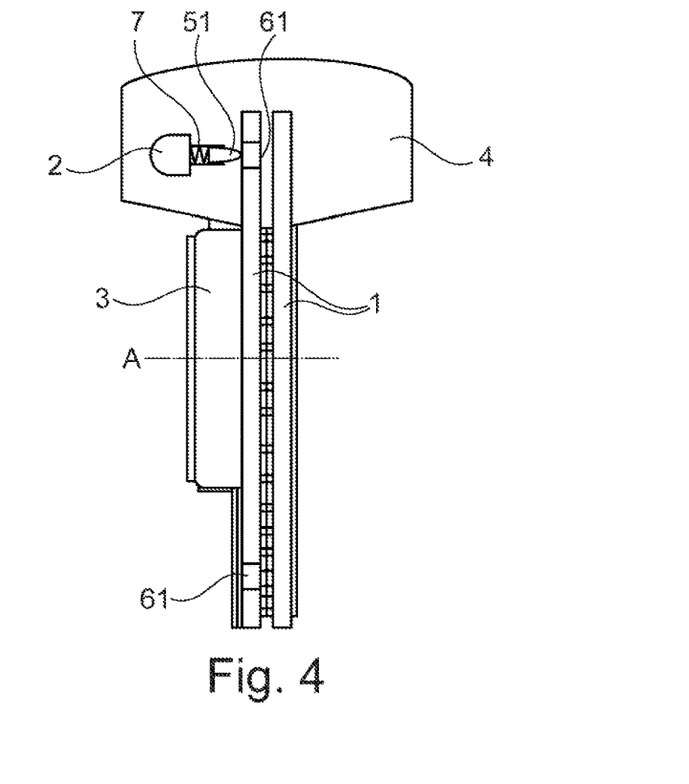
FIG. 4 shows a schematic lateral view of a disc brake of a braking system in an open, non-braked position according to the present subject matter.
Figure 5:
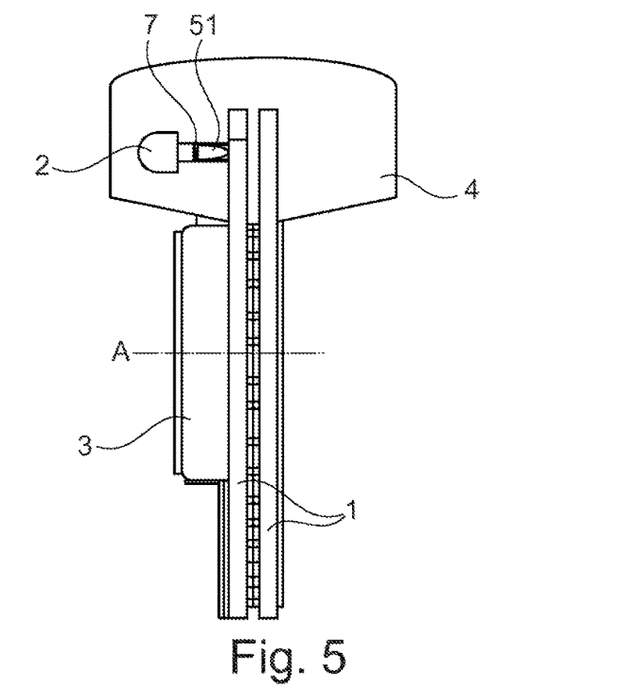
FIG. 5 shows a schematic lateral view of a disc brake of a braking system in an intermediate state between a braked and a non-braked position according to the present subject matter.
Figure 6:
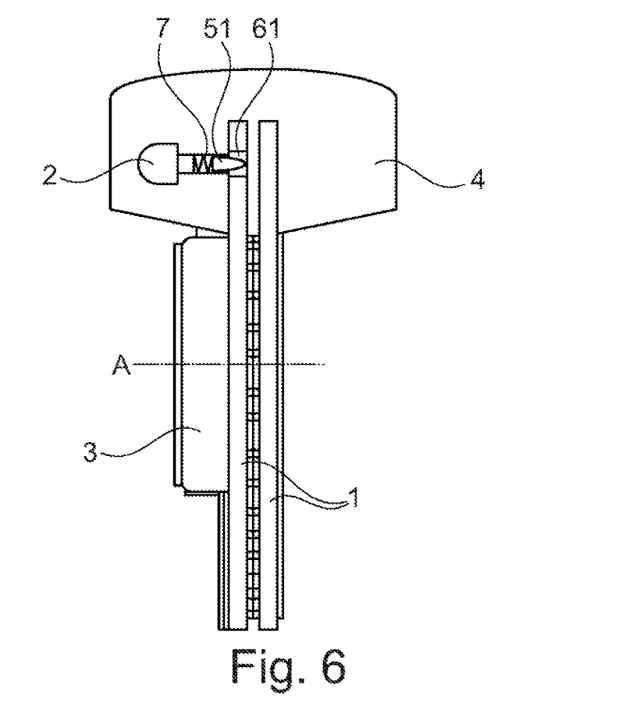
FIG. 6 shows a schematic lateral view of a disc brake of a braking system in a braked position according to the present subject matter.

FIGS. 4-6 show a further exemplary embodiment of a braking system according to the invention. To be seen here is likewise a disc brake in a lateral view, the disc brake comprising a brake disc 1 and a disc chamber 3 which during travel conjointly rotate with the vehicle wheel. Furthermore, the disc brake likewise comprises a brake caliper 4.

Instead of the blocking catch 5 and the ratchet wheel 6 embodiment shown in FIGS. 1 and 2, the blocking element in this example is implemented by a pin 51 which is integrated in the brake caliper 4, and the receptacle device is implemented by a perforated element 61 which is integrated in the brake disc 1. The pin 51 here is disposed so as to be substantially parallel to the rotation axis of the wheel and in this direction (as can be seen in FIG. 5) engages in the perforated element 61.

FIG. 4 here shows the braking system in the situation in which the pin 51 does not engage in the perforated element 61, wherein the engaging setting of the locking device is shown in FIG. 6. The intermediate position of the pin 51, already explained above, is schematically indicated in FIG. 5, wherein the pin 51 engages in the perforated element 61 by the pre-loaded compensation spring 7 only once reaching the maximum critical rotating speed mentioned of the wheel, or the critical speed of the vehicle, respectively.

As has already been mentioned and can be seen in FIG. 4, the perforated element 61 here is integrated in the brake disc 1 in that a plurality of bores or holes, respectively, which extend across the circumference of the brake disc and in which the pin 51 can engage are provided, the wheel thus being mechanically locked by the form-fit mentioned. The pin 51 from FIG. 4 here is also held in the opened position by a pre-loaded pre-load spring. The pre-load is released in FIG. 6, and the pin 51 according to the method which has already been explained in FIG. 1 and FIG. 2 engages in the perforated element 61. The exemplary embodiment from FIGS. 4-6 accordingly differs from the exemplary embodiment of FIG. 1, FIG. 2 and FIG. 3 only in terms of the design embodiment of the blocking element and of the receptacle element.

Figure 7:
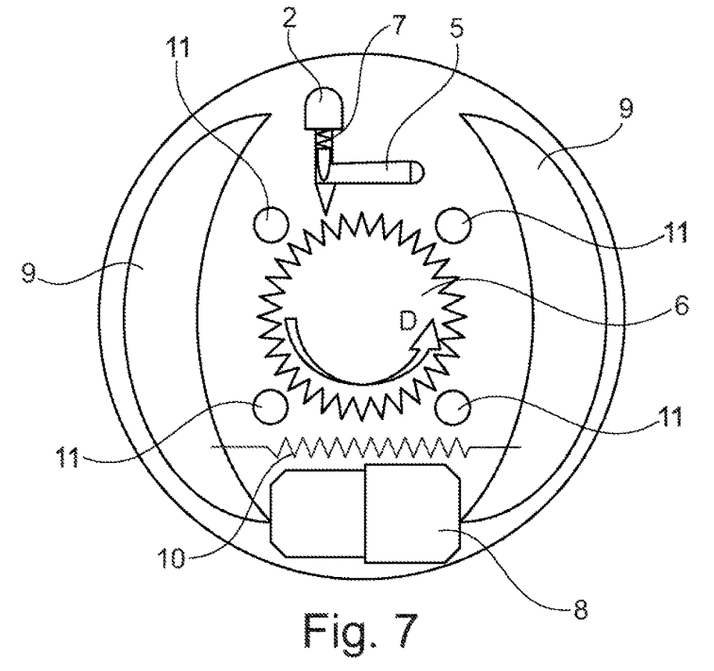
FIG. 7 shows a schematic front view of a drum brake of a vehicle according to the present subject matter.
Figure 8:
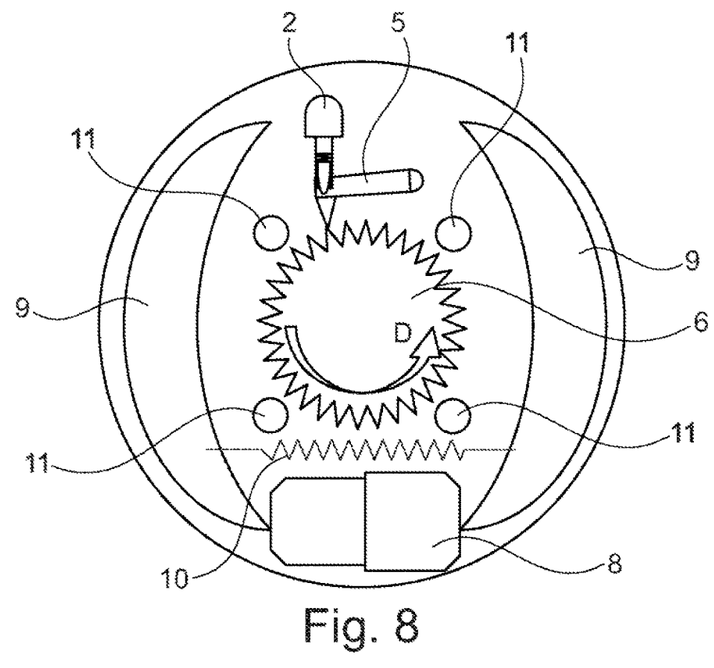
FIG. 8 shows a schematic front view of a drum brake of a vehicle according to the present subject matter.
Figure 9:
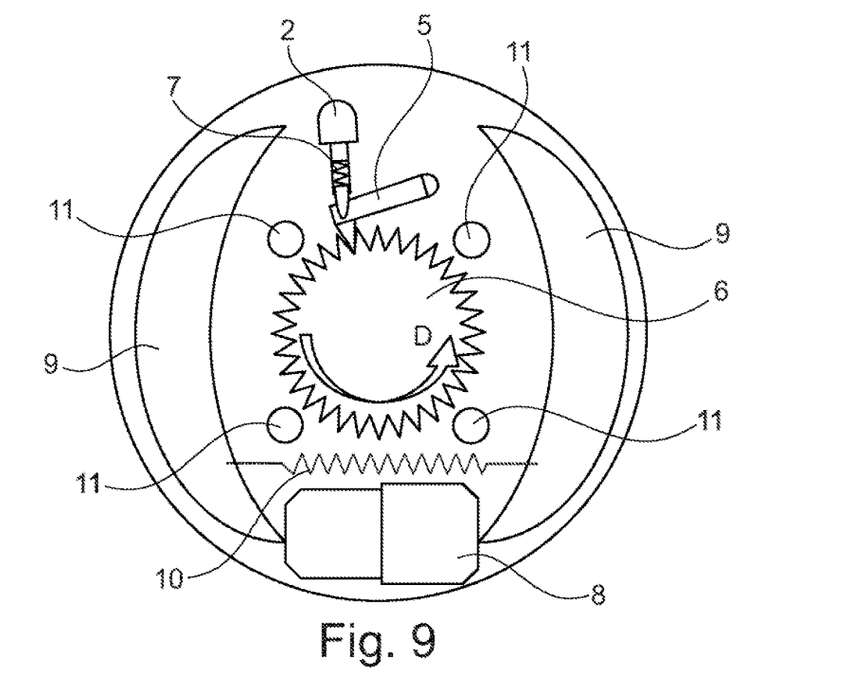
FIG. 9 shows a schematic front view of a drum brake of a vehicle according to the present subject matter.

FIGS. 7-9 schematically show a drum brake which, by way of a blocking catch 5 as the blocking element and a ratchet wheel 6 as the receptacle element, comprises the mechanical locking unit according to the invention. The configuration and functional mode of the mechanical locking device here is exactly the same as has already been described in the context of the other figures. The only difference in comparison to FIGS. 1-3 here is that the service brake system is a drum brake and not a disc brake.

The schematically illustrated drum brake represents a drum brake known from the prior art, which comprises inter alia a hydraulic actuator 8 for activating two brake blocks 9 and a retraction spring 10 for the brake blocks 9. The blocking catch 5 is disposed on a part of the drum brake that by means of screw-fitment points 11 is mounted so as to be fixed to the vehicle (thus not conjointly rotating with the wheel of the vehicle). In contrast, the ratchet wheel 6 is connected in a rotationally fixed manner to a part of the drum brake that rotates conjointly with the vehicle wheel. As already explained in the other figures, the mechanical locking device in this example also comprises a pre-load spring by way of which the blocking catch 5 is held in an opened position. As has already been described in detail in FIG. 2, an intermediate position of the blocking catch 5 is furthermore provided, this intermediate position to be seen in FIG. 8. It is provided here that the blocking catch 5 engages in the ratchet wheel 6 only upon reaching a critical rotating speed of the vehicle wheel, or a critical speed of the vehicle, respectively, while the pre-load by the pre-load spring in the actuator 2 for the blocking element 5 is however already largely released. A locked position of the locking device in which the blocking catch 5 engages in the ratchet wheel 6 is shown in FIG. 9.

Figure 10:
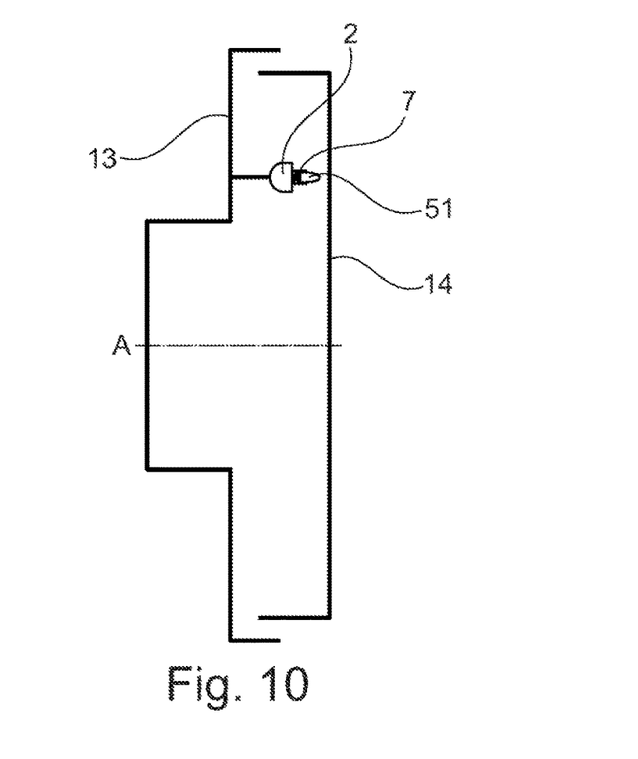
FIG. 10 shows a schematic cross-sectional view of a drum brake of a vehicle according to the present subject matter.
Figure 11:
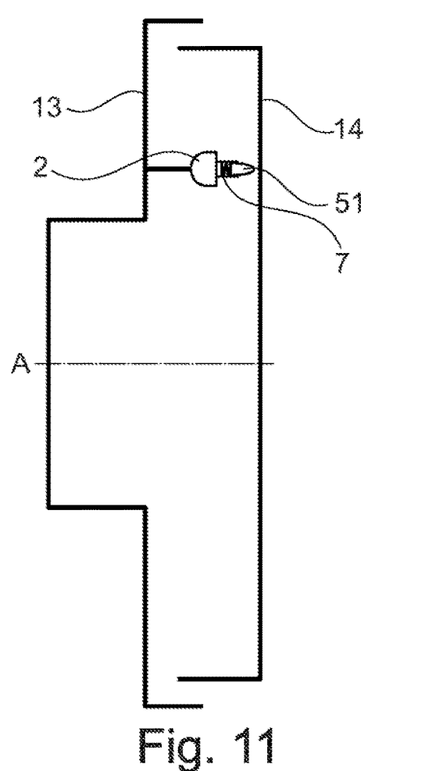
FIG. 11 shows a schematic cross-sectional view of a drum brake of a vehicle according to the present subject matter.
Figure 12:
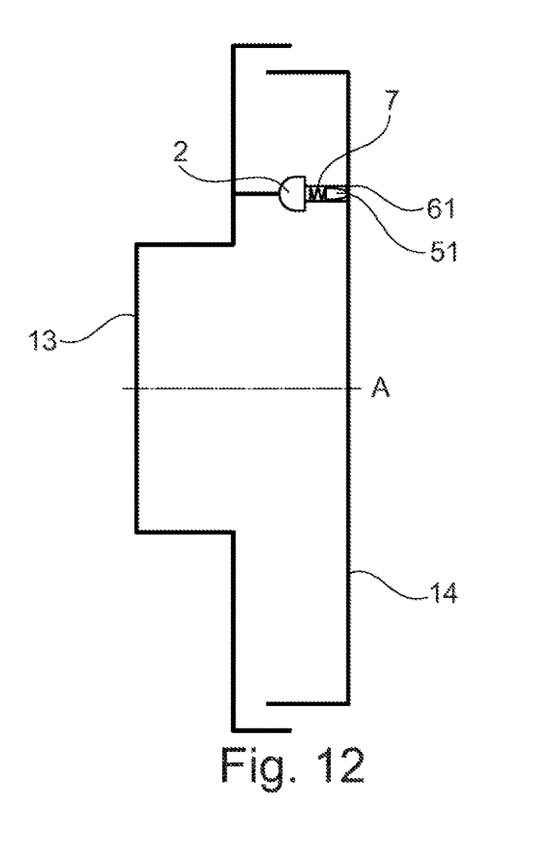
FIG. 12 shows a schematic cross-sectional view of a drum brake of a vehicle according to the present subject matter.

FIGS. 10-12 show a drum brake of a vehicle in a simplified schematic sectional view through the rotation axis A. The external part 13 of the drum brake does not rotate conjointly with the rotating movement of the vehicle wheel, while the internal part 14 of the drum brake is connected in a rotationally fixed manner to the vehicle wheel. Provided as a mechanical locking device in this example is the blocking element as the pin 51 and the receptacle element as the perforated element 61. The functional mode and the construction and configuration of the mechanical locking device per se here is the same as described in FIGS. 4-6. The only difference in comparison to FIGS. 4-6 here is that the service brake is not a disc brake but a drum brake. The pin 51 here is fixedly connected to a part 13 of the drum brake that is fixed to the vehicle, and the perforated element is fixedly connected to a part 14 of the drum brake that is rotationally fixed (to the wheel). Shown in FIG. 11 is the intermediate position of the pin 51, pre-loaded by the compensation spring 7, as is described in detail in FIG. 5, until the vehicle wheel, or the vehicle, respectively, has reached the maximum critical rotating speed or speed, respectively. The pin 51 in FIG. 10 is shown in a non-locked position while the pin 51 in FIG. 12 engages in the perforated element 61.

LIST OF REFERENCE SIGNS

1 Brake disc
2 Actuator of the blocking element
3 Disc chamber
4 Brake caliper
5 Blocking catch
51 Pin
6 Ratchet wheel
61 Perforated element
7 Compensation spring of the intermediate position
8 Hydraulic actuator
9 Brake block
10 Retraction spring
11 Screw-fitment point
13 External part of the drum brake
14 Internal part of the drum brake
A Wheel rotation axis

What is claimed is:

1. A braking system for a vehicle having a vehicle wheel, comprising:
   a friction brake assigned to the vehicle wheel and configured to act during an operation state of the vehicle and/or while the vehicle is in a parked state; and
   a blocking element of the vehicle wheel, wherein
      the blocking element is configured to fix, in a form-fitting manner, the vehicle wheel during the parked state of the vehicle to prevent the vehicle wheel from rolling, wherein
      while the vehicle is in the operation state and the blocking element is pre-loaded and disengaged from a receptacle element, the braking system is configured to
         detect a change of the vehicle to a parked state;
         move the blocking element in a direction of the receptacle element;
         release the pre-load of the blocking element such that the blocking element is configured to engage the receptacle element; and
         adjust a position of the blocking element, while engaged in the receptacle element, from an initial position to a second position, wherein
            the receptacle element is configured to be positioned,
            the mass of the blocking element is configured to be adjusted, and
            the pre-load of a compensation spring is configured to be adjusted, wherein
               the pre-load of the blocking element is configured to be released only upon reaching a critical rotating speed of the vehicle wheel,
               the blocking element is configured to engage in the receptacle element only upon reaching this critical rotating speed, and
               the position of the blocking element, while engaged in the receptacle element, is configured to be adjusted from an initial position to a second position.

2. The braking system according to claim 1, wherein the blocking element is further configured to engage a receptacle element connected in a rotationally-fixed manner to the vehicle wheel during the parked state of the vehicle.

3. The braking system according to claim 2, wherein the blocking element is a blocking catch, and the receptacle element is a ratchet wheel disposed coaxially with the wheel rotation axis and connected in a rotationally fixed manner to the vehicle wheel.

4. The braking system according to claim 2, wherein the blocking element is a pin, and the receptacle element is a bore on a perforated element comprising a plurality of bores and disposed coaxially with the rotation axis of the vehicle wheel and connected in a rotationally fixed manner to the vehicle wheel.

5. The braking system according to claim 2, wherein the receptacle element is disposed in a region of the wheel or an axle of the vehicle.

6. The braking system according to claim 2, wherein the receptacle element is integrated with a friction element of the friction brake.

7. The braking system according to claim 4, wherein the receptacle element is disposed on a brake disc of the friction brake of the vehicle.

8. The braking system according to claim 2, wherein the blocking element is fixed to the vehicle on a brake caliper or on a friction brake mount.

9. The braking system according to claim 2, further comprising:

an installation for fixing the position of the blocking element, the installation generating a plurality of positions comprising:
- a first position wherein the blocking element engages in the receptacle element; and
- a second position wherein the blocking element is disengaged from the receptacle element.

10. The braking system according to claim 9, wherein the installation for fixing the position of the blocking element comprises one or more of:
- a spring element,
- a magnet, and/or
- a cable pull.

11. The braking system according to claim 9, wherein the installation for fixing the position of the blocking element activatable electrically, electro-hydraulically, hydraulically, magnetically, and/or mechanically.

12. The braking system according to claim 1, wherein the blocking element is configured to be moved by way of an electrical, mechanical, magnetic, electro-hydraulic, and/or hydraulic installation.

13. The braking system according to claim 1, wherein the blocking element is configured to be removed from the receptacle element and returned to the initial position while transitioning the vehicle from the parked state to the operation state.

14. The braking system according to claim 1, wherein the blocking element is:
- mechanically coupled to a parking brake of the vehicle,
- configured to be released in the direction of the receptacle element when activating the parking brake, and
- configured to be is returned to the initial position when deactivating the parking brake.

15. A method for operating a braking system for a vehicle having a vehicle wheel, the braking system comprising a friction brake assigned to the vehicle wheel and configured to act during an operation state of the vehicle and/or while the vehicle is in a parked state; and a blocking element of the vehicle wheel, wherein the blocking element is configured to fix, in a form-fitting manner, the vehicle wheel during the parked state of the vehicle to prevent the vehicle wheel from rolling, and the vehicle is in the operation state and the blocking element is pre-loaded and disengaged from a receptacle element, the method comprising:
- while detecting a change of the vehicle to a parked state:
  - moving the blocking element in a direction of the receptacle element; and
  - releasing the pre-load of the blocking element such that
    - the blocking element engages the receptacle element and the position of the blocking element, while engaged in the receptacle element, is adjusted from an initial position to a second position, wherein the receptacle element is positioned,
    - the mass of the blocking element is adjusted, and
    - the pre-load of a compensation spring is adjusted, wherein
      - the pre-load of the blocking element is released only upon reaching a critical rotating speed of the vehicle wheel,
      - the blocking element engages in the receptacle element only upon reaching this critical rotating speed, and
      - the position of the blocking element, while engaged in the receptacle element, is adjusted from an initial position to a second position.

16. The method according to claim 15, wherein the blocking element is moved by way of an electrical, mechanical, magnetic, electro-hydraulic, and/or hydraulic installation.

17. The method according to claim 15, wherein while transitioning the vehicle from the parked state to the operation state, the blocking element is removed from the receptacle element and returned to the initial position.

18. The method according to claim 15, wherein
the blocking element is mechanically coupled to a parking brake of the vehicle,
the blocking element, when activating the parking brake, is released in the direction of the receptacle element, and
the blocking element, when deactivating the parking brake, is returned to the initial position.

* * * * *